US005980227A

United States Patent [19]

Murata et al.

[11] Patent Number: 5,980,227

[45] Date of Patent: Nov. 9, 1999

[54] APPARATUS FOR SHAPING HONEYCOMB STRUCTURE

[75] Inventors: Masakazu Murata, Obu; Seiichi Fukaya, Kariya; Nobutoshi Matsui, Nagoya; Toshiaki Tanida, Okazaki, all of Japan

[73] Assignee: Denso Corporation, Kariya, Japan

[21] Appl. No.: 08/834,601

[22] Filed: Apr. 7, 1997

[30] Foreign Application Priority Data

Apr. 8, 1996 [JP] Japan .................................... 8-111916

[51] Int. Cl.[6] ...................................................... B29C 47/86

[52] U.S. Cl. ................. 425/144; 264/177.12; 425/378.1; 425/379.1; 425/461

[58] Field of Search ................................ 425/144, 378.1, 425/379.1, 382 R, 461; 264/177.12

[56] References Cited

U.S. PATENT DOCUMENTS

| | | | |
|---|---|---|---|
| 3,919,384 | 11/1975 | Cantaloupe et al. | 264/177.12 |
| 4,364,881 | 12/1982 | Mizuno et al. | 264/40.7 |
| 4,915,612 | 4/1990 | Gangeme et al. | 425/464 |

FOREIGN PATENT DOCUMENTS

| | | |
|---|---|---|
| 55-36486 | 9/1980 | Japan . |
| 3-133513 | 6/1991 | Japan . |
| 4-52024 | 2/1992 | Japan . |
| 6-106607 | 4/1994 | Japan . |
| 2172840 | 10/1986 | United Kingdom . |

*Primary Examiner*—Harold Pyon
*Assistant Examiner*—Joseph Leyson
*Attorney, Agent, or Firm*—Pillsbury Madison & Sutro LLP

[57] ABSTRACT

Apparatus for forming a honeycomb structure capable of adjusting a shaping speed of an outer skin of the honeycomb structure, thereby preventing a defect in the skin. The shaping device is constructed by a die (10) having slits (11) for formation of a honeycomb structure and a guide ring (2) arranged downstream of the die (11). The guide ring includes an opening with an inner edge (21) and includes at a location upstream from the edge a pool portion (22) for the formation of a skin of the honeycomb structure. A temperature controller (3) is arranged in the guide ring for controlling a heating on a cooling of a ceramic material held in the pool portion (22).

7 Claims, 5 Drawing Sheets

APPARATUS FOR SHAPING HONEYCOMB STRUCTURE

BACKGROUND OF THE INVENTION

1. Field of the Invention

The present invention relates to an apparatus and method for forming a honeycomb body.

2. Description of Related Art

Known in the prior art is a method for producing a honeycomb structure, wherein a ceramic material is extruded from a die having a plurality of slits, while a guide ring is provided at a peripheral portion of the die. A flow of the ceramic material from the die is blocked at the guide ring, so that the material issued from the slits is collapsed, thereby providing a skin portion around a core portion in the honeycomb structure.

In order to produce a desired shape of the honeycomb structure, it is essential to desirably control the flow speed of the ceramic material via the die, which is influenced by various factors. In view of this, a Japanese Examined Patent Publication No. 55-36486 discloses an extrusion of a ceramic material by a screw extruder having an outside heating device arranged at a location upstream from a die, so that the ceramic material is subjected to heating by the heater prior to the extrusion from the extruder, so that the ceramic material during the extrusion process is subjected to a uniform state of the heating.

However, the prior art directed to a uniform control of a temperature at the entire part is not sufficient from a view point of control of a desirable control of the flow speed at an entire part of the die. Namely, the desired control of the flow speed is required not only at the core portion but also at the masked peripheral portion. Namely, unmatched flow speed between the core portion and the masked portion causes defects, such as cracks or creases to be generated at a skin portion of the honeycomb structure. In order to obtain such a matched speed at the core and peripheral portion, tiresome work is necessary for an adjustment of the guide ring due to the fact that a flow speed of the ceramic material is influenced by various factors, which increases the production cost.

SUMMARY OF THE INVENTION

An object of the present invention is to provide a method and apparatus for producing a honeycomb structure, capable of obtaining a fine adjustment of the flow speed at the outer peripheral portion of the honeycomb structure, thereby preventing any defect from being generated at a skin portion of the honeycomb structure.

An apparatus for shaping a honeycomb structure from a material comprises:

- a die including a plurality of slits through which the material flows to create the honeycomb structure;
- a guide ring arranged a location downstream from the die, said guide ring having an inner opening having an edge for restricting the outer diameter of a product, while forming a pool portion on one side of the edge adjacent the die for a formation of a skin portion of the honeycomb structure, and;
- a temperature controller arranged at the guide ring for obtaining an adjustment of the temperature of the guide ring.

The guide ring includes an inner edge for limiting the outer diameter of a honeycomb structure as produced, i.e., the outer diameter of a skin of the honeycomb structure, while the pool portion is a space of a diameter larger than that of the edge and is formed by a recess in the guide ring at a location upstream from the edge.

During the operation of the apparatus according to present invention, the temperature controller is operated for heating or cooling the pool part of the guide ring. As a result, the temperature of the ceramic material held in the pool part of the guide ring is controlled in accordance with a shaped condition of a skin of a honeycomb structure as produced. Namely, in a situation that a speed of the flow of the ceramic material at the skin portion is slower than the flow speed at the body portion, the temperature controller is operated to heat the ceramic material at the pool portion in order to increase a flowability, so that the skin formation speed is matched to the core formation speed, thereby preventing cracks from being generated at the skin.

Contrary to this, in a situation that a speed of the flow of the ceramic material at the skin portion is faster than the flow speed at the body portion, the temperature controller is operated to cool the ceramic material at the pool portion in order to decrease a flowability, so that the skin formation speed is matched to the core formation speed, thereby preventing ceases from being generated at the skin.

Thus, according to present invention, a localized control of the ceramic material for formation of a skin of a honeycomb structure is done in accordance with a shaped condition of the skin. Thus, a flowability of the ceramic material is desirably adjusted regardless a time dependent change of properties of ceramic material, thereby balancing the formation speed between a core and skin of the honeycomb structure. In other words, a frequent replacement of parts, such as a guide ring becomes unnecessary, thereby increasing productivity drastically.

The temperature controller includes at least one of a heating device and cooling device.

Only a provision of a heating device will be sufficient in a circumstance of a shaping device that it is always likely that the skin formation speed is slower than the core formation speed. In this case, a desired effect will be obtained only by controlling the degree of the heating.

Contrary to this, a provision of a cooling device will be sufficient in a circumstance of a shaping device that it is always likely that the skin formation speed is faster than the core formation speed. In this case, a desired effect will be obtained only by controlling the degree of the cooling.

The provision of both of the heating and cooling devices allows the system to be matched to a situation in a wide range. In this case, the heating and cooling devices are integrated as an heat exchanging pipe in which both hot water and cool water are selectively introduced.

The temperature controller is arranged inside the guide ring at a location faced with said pool portion. As a result of this construction, effective heating or cooling is applied to a ceramic material for a skin formation which is held in the pool portion.

A temperature sensor arranged in the guide ring for detecting the temperature of the guide ring is further provided. Thus, an increased precision of the control by the temperature control device is obtained.

The guide ring forms a recess on one side of the edge adjacent the die, so that the pool portion is formed between the recess and the die. Namely, the recess located upstream from the guide ring has a diameter larger than the inner diameter of the edge and is faced with the die, so that the pool portion is formed. As a result, an operation is obtained that a ceramic material extruded from the die to the pool portion is, first, contacted with the recess and is stayed at the pool portion, which makes a skin portion of the honeycomb structure easily formed.

A method for shaping a honeycomb structure from a material is provided and comprises the steps of:

providing a die including a plurality of slits through which the material flows for creating the honeycomb structure;

providing a guide ring arranged at a location downstream from the die, said guide ring having an inner opening having an edge for restricting the outer diameter of a product, while forming a pool portion on one side of the edge adjacent the die for a formation of a skin portion of the honeycomb structure;

supplying a ceramic material to the die so that the material flows through the slits of the die and is extruded from the slits, so that the material extruded from the slits without being masked by the ring forms a body portion of the honeycomb structure, and the material extruded from the slit while being masked by the guide ring is temporarily held in the pool portion and then forms a skin portion of the honeycomb structure, and;

controlling the temperature of the guide ring to obtain a desired state of the skin portion of the honeycomb structure as produced.

The essential point of the method according to the present invention is that the extrusion is done while the temperature of the guide ring is controlled. As a result, a temperature control is applied via the guide ring to the ceramic material held in the pool portion for a skin formation, so that a fine adjustment of the flowability becomes possible. Thus, the method of formation of a honeycomb structure according to present invention makes it possible to obtain an advantage that a generation of defects, such as cracks or creases is less likely.

BRIEF DESCRIPTION OF ATTACHED DRAWINGS

DETAILED EXPLANATION OF A PREFERRED EMBODIMENT

Figure 1:
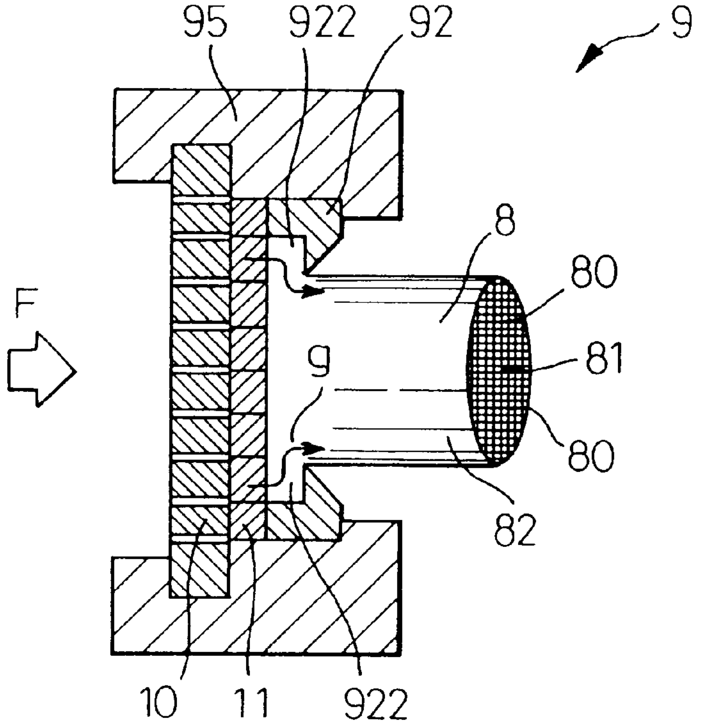
Fig.1 (Prior Art)
FIG. 1 is diagrammatic view of a system for a formation of a honeycomb structure in a prior art.
Figure 2:
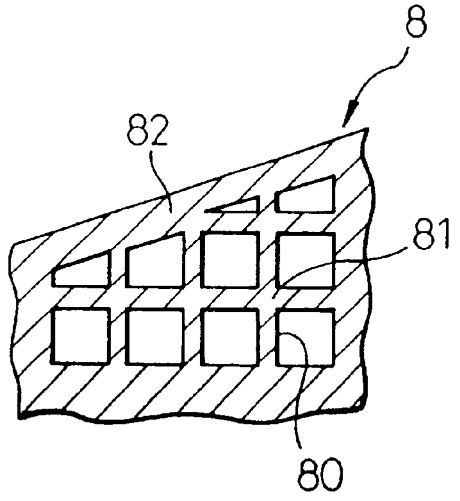
FIG. 2 is a partial enlarged view of a honeycomb structure.
Figure 3:
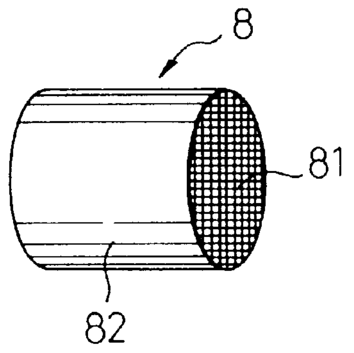
FIG. 3 is a perspective view of a honeycomb structure.

Now, a problem to be solved by the present invention will be explained with reference to FIGS. 1 to 5. FIG. 1 shows a formation of a honeycomb structure in a prior art. In FIG. 2, the honeycomb structure 8 is constructed by a cell body 81 forming a plurality of cells 80, and an outer skin 82 covering the cell body 81. See also FIG. 3.

In FIG. 1, an apparatus for a continuous formation of the honeycomb structure 8 is constructed by a shaping device 9 and a die 10. The die 10 is formed with a plurality of slits 11 for formation of the honeycomb structure. The shaping device 9 is arranged downstream from the die 10 and is provided with a guide ring 92. The guide ring 92 includes a pool portion 922 for a formation of the skin 82 of the honeycomb structure 80. The shaping device 9 is further provided with a holder 95 for connecting the die 10 and the guide ring 92 with each other.

In the extrusion process by the shaping device 9, a ceramic material from a screw extruder (not shown) located upstream is introduced into the die 10 as shown by an arrow F. In this case, the ceramic material extruded from the die 10 and not pooled at the guide ring 922 constructs a body portion 81 of the honeycomb structure 8 having a body with a plurality of cells 81. Contrary to this, the ceramic material extruded from the die 10 at its outer peripheral portion and masked by the pool portion 922 is displaced radially inwardly, while collapsing the honeycomb structure and is then flowing in the direction of the extrusion at the inner edge of the guide ring 92 as shown by an arrow g, so that a skin portion 82 encircling the body portion 81 is created.

The above mentioned method and apparatus for formation of the honeycomb structure in the prior art is defective in that a stable formation of the skin of the honeycomb structure is difficult. Namely, a flow characteristic of the ceramic material is varied by various factors, such as variations in the diameters or shapes of particles, the amount of moisture, the degree of mixing, the atmospheric temperature and a humidity. As a result, the flow characteristic is always changing even during a day due to the variation in the above mentioned factors, which makes it difficult to maintain a predetermined shaping condition.

Such a change in the flow characteristic causes the extruding characteristic to be largely influenced. Furthermore, a desired size as well as shape of the pool part 922 in the guide ring 92 is determined by the flow characteristic of the ceramic material. Thus, in order to obtain a desired flow characteristic, dies of different size and shape are prepared, then tests for forming the honeycomb structures are done by using the different dies, and finally a die is selected which provides the most suitable result. However, such a setting of the shaping apparatus does not necessarily cause the skin to set to a desired condition, since the extruding characteristic is always being subjected to changes due to changes in factors such as environmental conditions and the condition of the raw material.

Figure 4:
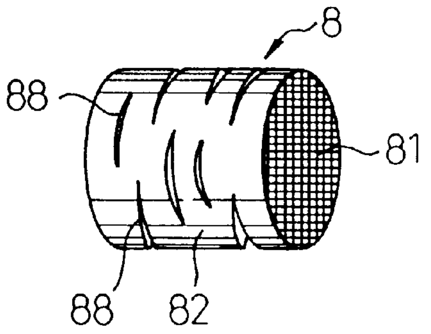
FIG. 4 is a perspective view of a honeycomb structure with cracks at a skin.
Figure 5:
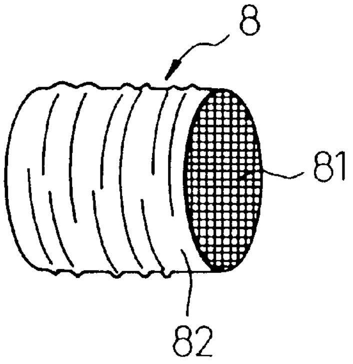
FIG. 5 is a perspective view of a honeycomb structure with creases at a skin.

The flow characteristic is also important as reference to a balance between the speed for formation of the body portion 81 and the speed for formation of the skin portion 82. In other words, when such a balance is lost, defects such as cracks or creases appear on the outer skin part 82 of the honeycomb structure as shown in FIG. 4 or 5. It is believed that the crack 88 (FIG. 4) is generated under a condition that the speed for the formation of the outer skin 82 is slower than the speed for the formation of the body portion 81. Contrary to this, it is also believed that the crease is generated under a condition that the speed for the formation of the outer skin 82 is faster than the speed for the formation of the body portion 81. Thus, tiresome work, such as replacement of the guide ring by dismantling the shaping apparatus 9 or an addition of an auxiliary flow control plate at a location upstream from the die is frequently needed to obtain a desired shape of the honeycomb structure as produced.

However, these solutions only apply to specific conditions which otherwise cause the product to be defective.

Furthermore, the replacement of the guide rings only allows a step-like adjustment. In other words, a fine adjustment between those obtained by the guide rings cannot be done. Furthermore, prolonged work is needed for the replacement of the guide rings, which reduces the production efficiently.

Now, embodiments of the present invention capable of overcoming the difficulty in the prior art will be explained with reference to FIGS. 6 to 9.

Figure 6:
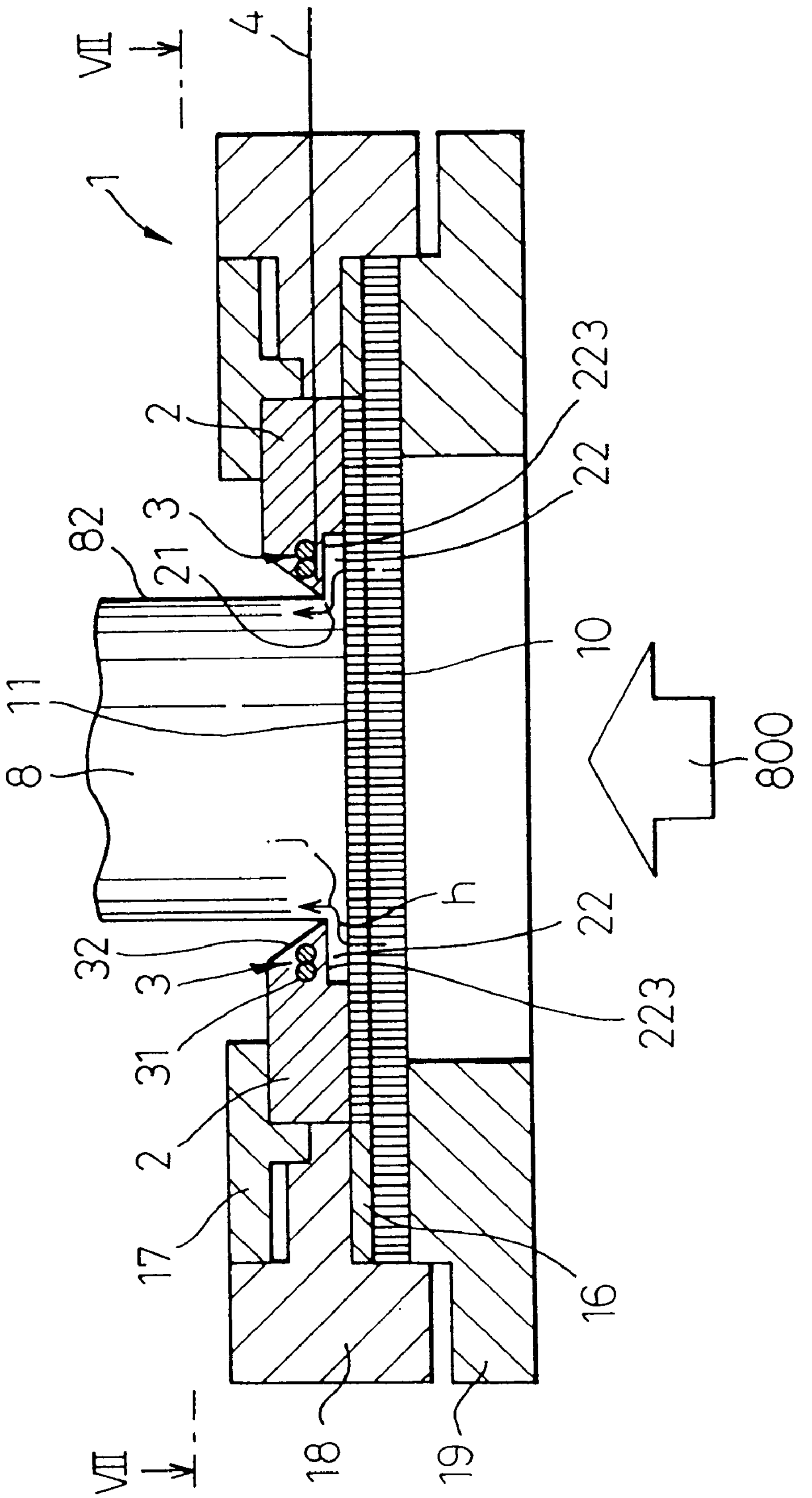
FIG. 6 is a cross sectional view of a shaping device according to present invention.
Figure 7:
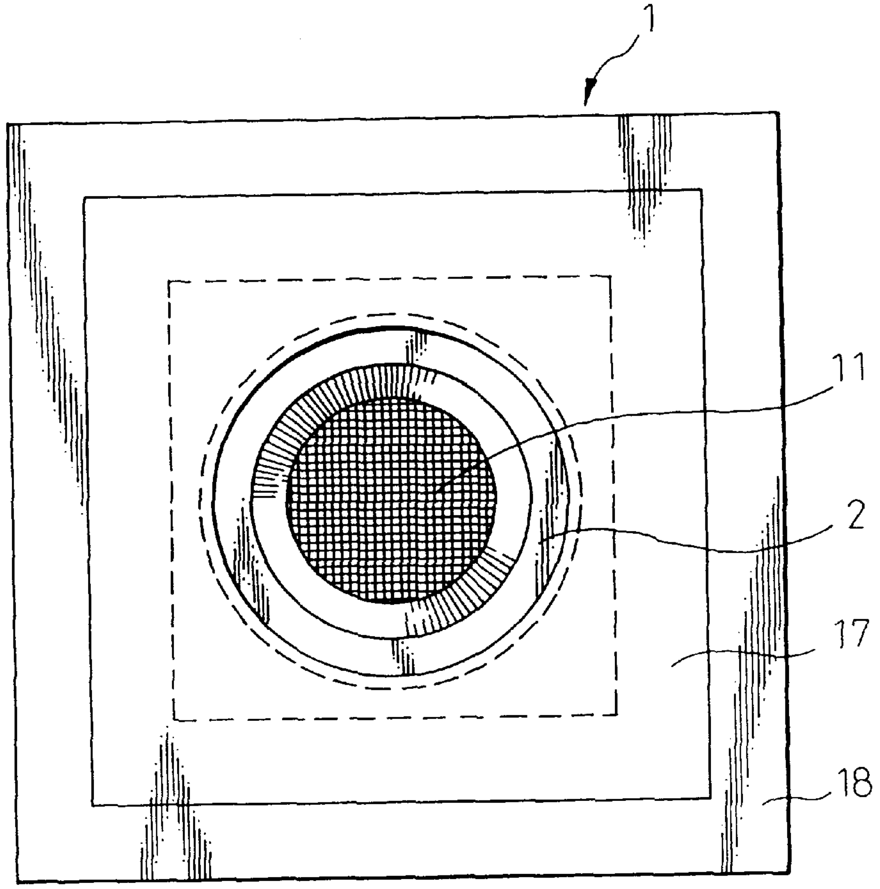
FIG. 7 is a plain view of the shaping device, which is a view taken along a line VII—VII in FIG. 6.

In FIG. 6, the apparatus 1 for shaping the honeycomb according to the present invention is constructed by a die 10 having a plurality of slits 11 for a formation of cells of a honeycomb structure, a guide ring 2 arranged at a location downstream from the die 10 in a direction of the flow of the ceramic material. The guide ring 2 is, at its inner periphery, formed with an inwardly projected portion having a tapered edge 21, while a recess 223 is formed on the side of the projection faced with the die 10, so that a pool portion 22 is formed between the die 10 and the guide ring. As will be fully described later, a temperature control device 3 is arranged in the guide ring 2.

The die 10 is held between an upper or first holder 18 and a lower or second holder 19 by means of suitable fixing means so that the die 10 is detachable from the holders 18 and 19. The guide ring 2 is rested on the die 10 and is releasably held by using a guide presser 17 by means of suitable fixing means. Thus, the guide ring 2 is also detachable. In order to allow the die 10 of different type (different thickness) to be mounted, a spacer 16 of a suitable thickness is arranged between the holders 18 and 19.

Figure 8:
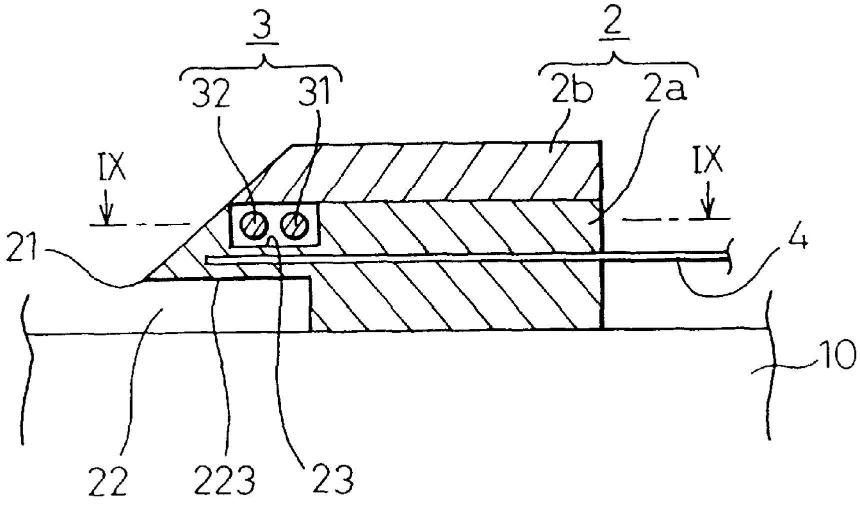
FIG. 8 is a partial enlarged view of a guide ring in FIG. 6.
Figure 9:
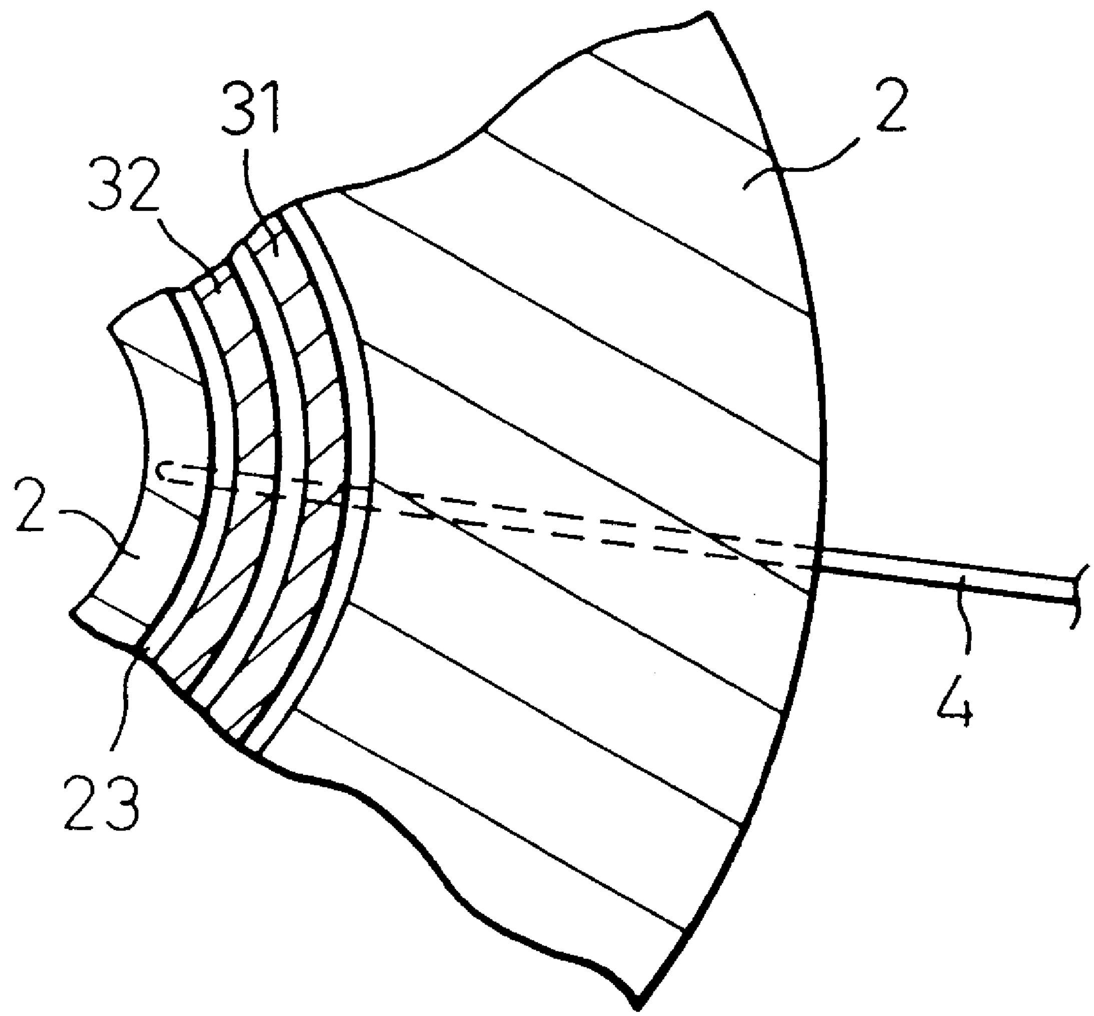
FIG. 9 is a cross sectional view taken along a line IX—IX in FIG. 8.

As shown in an enlarged view in FIG. 8, the guide ring 2 is constructed by a bottom portion **2*a* on the die 10 and forming the edge 21 and the recess 223, as explained with reference to FIG. 6 and a top portion 2*b* fixedly connected to the bottom portion 2*a*. The bottom portion 2*a* of the guide ring 2 is, at a location opposite the pool part 22, formed with an annular recess 23 opened to its top surface, in which a heater device 3 is arranged. The recess 23 as stored the heater device 3 is sealingly closed by the top portion 2*b* rested on the bottom portion 2*a* as shown in FIG. 8. As shown in FIG. 9, the heater device 3 is constructed by a ring shaped heating member 32 and a cooling pipe 31. The cooling pipe 31 is in connection with a chiller (not shown) so that a cooling water is recirculated between the cooling pipe 31** and the chiller.

As shown in FIGS. 6, 8 and 9, a temperature sensor constructed as a thermocouple 4 is buried in the lower part **2*a* of the guide ring at a location downstream from the temperature controller 3, so that an electric signal indicative of the temperature of the guide ring 2 is issued from the thermocouple 4. The electric signal from the thermocouple 4 is used for controlling the temperature control device 3**.

Now, an operation of the shaping device 1 for a formation of a honeycomb structure will be explained. A ceramic material from a screw extruder (not shown) is introduced into the die 10 as shown by an arrow 800 at a predetermined pressure. The ceramic material passed through slits 11 of the die 10 not masked by the guide ring 2 forms the body portion of the honeycomb structure. Contrary to this, the ceramic material passed through the die 10 at its peripheral part is masked by the guide ring 2. Namely, the ceramic material is introduced into the pool portion 22, whereat the direction of the flow of the ceramic material is, first, changed to a transverse direction as shown by an arrow h. The direction of the flow of the ceramic material is again changed at edge portion 21 to an axial direction as shown by an arrow j. Due to such an action of the ceramic material at the pool portion 22, the ceramic material is temporally held at the pool portion 22, so that a skin portion of the honeycomb structure is obtained.

During the extrusion process, an adjustment of the temperature of the guide ring 2 is done in accordance with the condition of the honeycomb structure being extruded. The temperature control of the guide ring 2 is done so that the temperature of the ceramic material for forming the honeycomb structure held at the pool portion 22 is controlled so that a desired flow condition of the ceramic material at the pool portion 22 is obtained. Namely, a flow speed at the pool portion is varied in accordance with a variation of various factors, such as a temperature, a humidity, a diameter or shape of the particle of the ceramic material, and a degree of a mixing, which may cause the flow of the ceramic material at the skin portion (pool portion 22) to be slower than the flow speed at the body portion, resulting in cracks being generated at the skin portion. In this case, the heater 32 of the temperature control device 3 is operated such that the ceramic material for a formation of the skin portion held at the pool part 22 is heated via the guide ring 2. This causes the flowability of the ceramic material to increase, which causes the flow speed at the pool part 22 to be increased to a value which is matched with the flow speed of the ceramic material for the formation of the body portion of the honeycomb structure, thereby preventing cracks from being formed on the skin portion.

Contrary to this, various factors, such as a temperature, a humidity, a diameter or shape of the particle of the ceramic material, and a degree of a mixing cause the flow of the ceramic material at the skin portion (pool portion 22) to be faster than the flow speed at the body portion, resulting in creases being generated at the skin portion. In this case, the cooler 31 of the temperature control device 3 is operated such that a cooling medium is passed, so that the ceramic material for a formation of the skin portion stayed at the pool part 22 is cooled via the guide ring 2. This causes the flowability to be decreased, which causes the flow speed at the pool part 22 to be decreased to a value which is matched with the flow speed of the ceramic material for the formation of the body portion of the honeycomb structure, thereby preventing creases from being formed on the skin portion.

In short, according to the present invention, a heating or cooling of the ceramic material only at the pool portion 22 for formation of a skin of the honeycomb structure is selectively done in accordance with the condition of the skin. As a result, even in a situation of a time dependent change of a property of the ceramic material, an adjustment is possible to equalize the speed of the formation of a skin with that of a core, thereby preventing a defect such as a crack or crease from being generated at the skin. Thus, according to the present invention, an adjustment of the shaping device for obtaining a product of a desired quality can be done with a reduced amount of work, such as replacement of parts, thereby enhancing productivity.

We claim:

1. An apparatus for shaping a honeycomb structure from a material, comprising:

a die including a plurality of slits through which the material is flown for creating the honeycomb structure;

a guide ring arranged at a location downstream from the die, said guide ring having an inner opening having an edge for restricting the outer diameter of a product, while forming a pool portion on one side of the edge adjacent the die for a formation of a skin portion of the honeycomb structure, and;

a temperature controller arranged at the guide ring for obtaining an adjustment of the temperature of the guide ring.

2. An apparatus according to claim 1, wherein said temperature controller includes at least one of a heating device and cooling device.

3. An apparatus according to claim 1, wherein said temperature controller is arranged inside the guide ring at a location faced with said pool portion.

4. An apparatus according to claim 1, further comprising a temperature sensor arranged in the guide ring for detecting the temperature of the guide ring.

5. An apparatus according to claim 1, wherein said guide ring forms a recess on one side of the edge adjacent the die, so that the pool portion is formed between the recess and the die.

6. An apparatus according to claim 1, wherein said guide ring includes a first ring portion resting on the die and a second ring portion resting on the first ring portion, the first ring portion being formed with a recess on the side of the first ring portion adjacent the second ring portion, the temperature controller being arranged in the recess and covered by the second ring portion.

7. An apparatus according to claim 1, wherein said temperature controller extends substantially along the entire circumference of the ring member.

* * * * *